United States Patent Office 3,493,414
Patented Feb. 3, 1970

3,493,414
EPOXY/POLYESTER COMPOSITIONS
John D. Hastings, Minneapolis, Minn., assignor to Ashland Oil & Refining Company, Ashland, Ky., a corporation of Kentucky
No Drawing. Filed Oct. 12, 1967, Ser. No. 674,724
Int. Cl. C09d 5/28, 3/64
U.S. Cl. 117—41                                            6 Claims

ABSTRACT OF THE DISCLOSURE

Amine-modified acidic polyesters as co-reactants with epoxies to produce resinous products. A textured protective surface coating is prepared by mixing an amine and water with an acidic polyester and reacting that mixture with a pigmented epoxidized vegetable oil at an elevated temperature.

BACKGROUND OF THE INVENTION

In recent years, those skilled in the coatings art have become increasingly aware of the advantageous film properties which can be obtained by the use of two-package coating vehicles. Such coating vehicles (or, more usually, paints prepared from such vehicles) are shipped, stored, and sold in separate complementary packages. The contents of the two packages are then mixed together at the time of use and the resulting mixture then applied to a surface in the usual fashion (e.g. by brushing).

In U.S. Patent 3,218,274 (which is incorporated herein by reference), Robert A. Boller and Richard B. Graver have described and claimed such a two-package, organic solvent based coating system. One of their two packages contained an epoxidized fatty compound (e.g. epoxidized soybean oil). The other package contained an acidic polyester which was used as a curing agent or a co-reactant for the epoxidized fatty compound of the first package. At the time of use, the contents of the two packages were mixed together and the resulting mixture spread in film form on a suitable substrate (e.g. wood) and cured (e.g. by baking or drying at room temperature) to thereby provide a decorative or protective coating.

One significant advantage of a preferred embodiment of that two-package coating system has been its ability to form thin supported films which cure at room temperature (e.g. 77° F. without a requirement for a catalyst) to form hard, glossy, tack-free, mar-resistant, durable coatings. Cured coatings (e.g. coatings on wood or metal) prepared from this two-package coating system have exhibited highly desirable properties in terms of (1) their non-yellowing tendency, (2) their ability to retain their original hard gloss for years without fading (although they can be made with a low gloss), (3) their durability, (4) their ability to be applied by brushing, spraying or rolling on common substrates such as wood, concrete, and metal, and (5) the ease with which dirt and common stains can be removed. On concrete or earthenware, this coating system provides a glazed ceramic-like appearance. Because of these and other desirable properties, coating compositions prepared according to this patent have enjoyed substantial commercial success.

More recently, Richard B. Graver and Stephen F. Hudak have discovered how the compositions of U.S. 3,218,274 can be improved by modifying the acidic polyester to make it more soluble in mineral spirits, thereby reducing or eliminating the odors of the aromatic solvents and active solvents employed in the previous compositions. This latter discovery forms one basis for the pending patent application of Graver and Hudak.

This application was originally filed as Ser. No. 570,761 on Aug. 8, 1966, now abandoned. A continuation-in-part was filed on Aug. 2, 1968 as Ser. No. 771,687.

According to their discovery, the polyester curing agents of U.S. 3,218,274 are made more soluble in mineral spirits by chemically incorporating (as opposed to blending) certain functional aliphatic compounds (e.g. an alkyl monocarboxylic acid) into the acidic polyesters, and at the same time, minimizing or preferably eliminating the use of non-chlorinated benzene carboxylic acids in the preparation of the polyesters. In a particularly preferred embodiment, their improved polyesters consist of the reaction products of (1) a polyhydric alcohol (e.g. pentaerythritol), (2) a chlorinated dicarboxylic acid or its anhydride (e.g. chlorendic acid), and (3) an aliphatic hydrocarbyl monocarboxylic acid (e.g. a $C_{18}$ fatty acid).

These modified polyesters, dissolved in mineral spirits and other solvents, are then used as co-reactants or curing agents for epoxy compounds. When cured by co-reaction at room temperature or by baking, they produce hard, tack-free, glass-like coatings.

SUMMARY OF THE INVENTION

I have now discovered that epoxy/polyester coating compositions of the type hereinbefore described can be made water-dilutable by the addition of an amine, water and, optionally, a wetting agent to the acidic polyester. The resulting amine-modified polyester is then useful as a co-reactant for epoxy compounds. By proper selection of amines, I am able to obtain wrinkled or textured finishes which, on metal, look like vinyl (e.g. a painted vinyl-like auto top). By using other amines, I am able to obtain hard, tack-free, smooth, glossy films. Furthermore, I have found that certain blends of amine-modified polyester have indefinite pot-life when blended with epoxidized fatty acid esters. Thus, I have been able to prepare blends which have had a useful life in excess of several months. Such blends are heat or catalyst convertible into cured films.

Modification of acidic polyesters in the manenr I have described inhibits their ability to cure epoxy compounds at ambient temperatures (e.g. 77° F.) without added catalyst. However, these compositions readily cure (tack-free) when baked or when catalyzed.

DETAILED DESCRIPTION

In describing the present invention, it is convenient to begin by first defining several terms.

The term "coating vehicle" as used herein means a liquid mixture of epoxy and acidic polyester, typically made with organic solvent or water (or both).

The term "two-package coating vehicle" as used herein means a coating vehicle having two or more active components which, although together forming a single coating vehicle, are so reactive that they are stored, sold, and shipped in commerce in separate containers or packages.

The terms "paint" and "varnish" as used herein mean coating compositions which contain a coating vehicle to which has been optionally added various pigments, toners, levelers, stabilizers, thickeners, catalysts, and the like. Inherently, the manufacture, use or sale of such a paint or varnish involves the manufacture, use or sale of the coating vehicle.

The term "mineral spirits" as used herein means a solvent useful in preparing paints or varnishes which consists of at least 60% by volume and preferably at least 70% by volume (e.g. above 80%) of saturated hydrocarbons (e.g. paraffinic or naphthenic hydrocarbons). Such solvents are well known to those skilled in the paint art and are readily available in commercial quantities. Suitable solvents include VM&P naphtha, Amsco 46, Varsol 1 and 2, commercial "mineral spirits," etc. The composition of such solvents can be determined by ASTM method D–1319 using fluorescent indicator analysis optionally assisted by mass spectrography. Typically, the boiling range (5%–95% distilled) of these solvents will be from 250–425° F., and more usually from 300°–400° F., e.g. 320°–390° F.

The term "cure" as used herein means the transformation of a liquid (e.g. a coating vehicle, paint, etc.) into a tack-free, resinous solid. During curing, a curable composition increases in viscosity as a result of cross-linking reactions. Solvent evaporation also occurs.

The term "infinite soluble" as used herein with reference to the solubility of acidic polyesters in mineral spirits means that the high solids (e.g. 80% NV) solution of acidic polyester which is initially prepared can be diluted indefinitely (i.e. diluted to approach zero percent NV) with mineral spirits. It should be understood that acidic polyesters are normally prepared using only a small amount of solvent (e.g. 80% NV) to thereby minimize the size of the reaction vessel needed and to shorten reaction times. Although such high solids solutions are liquids at esterification temperatures, they frequently solidify on cooling and consequently must be diluted before or during cooling to avoid solidification. Additional dilution to solids levels of, for example, 30–70% NV is often desired to thereby obtain a suitable viscosity for spraying, etc. Even further dilution is desirable to facilitate clean-up.

The term "partially soluble" as used herein with reference to the solubility of acidic polyesters in mineral spirits means that the high solids solution of acidic polyester initially prepared can be partly but not indefinitely diluted with mineral spirits. In this sense, the mutual solubility characteristics of the acidic polyesters and mineral spirits are much like the mutual solubility characteristics of two liquids, as contrasted to the solubility characteristics of a solid in a liquid). For this reason, solubility problems frequently appear as an acidic polyester is diluted with mineral spirits.

According to my invention, an organic solvent solution of an acidic polyester is mixed with an amine, water, and optionally, a wetting agent. The mixture can be made without heat and the order of mixing is not critical. Heating offers no particular advantage and, as a consequence, I prefer to form the mixture at room or ambient temperature (e.g. 60°–90° F.). This mixture is agitated until a clear or homogeneous mixture or dispersion is obtained.

The amount of amine used is an effective amount, i.e. the amount needed to form a good aqueous dispersion of the polyester. Typically, the amount of amine used will be less than 40 weight percent based on the weight of acidic polyester (e.g. 1–35 weight percent). Frequently, the amount of amine used will be from 5–30% by weight, e.g. 10–25% by weight on the same basis.

The amount of water used can vary widely, although amounts of 10–200% by weight, e.g. 50–150% by weight based on the weight of the acidic polyester will ordinarily be used. Desirably, the amount of water used will be equal to or more than the amount of organic solvent present with the acidic polyester.

Water-miscible co-solvents can be tolerated, but are not required by the present invention and they can be omitted. By "water-miscible" solvents, I mean those having a solubility in water (and of water in them) of 100% at 20° C.

Wetting agents can be used to assist in the preparation of homogeneous mixtures or dispersions, but they are not required. If used, they will generally be present in an amount less than 10% by weight based on the weight of the acidic polyester.

AMINES

Suitable amines include primary, secondary and tertiary aliphatic amines and alkanolamines. Mixtures of amines can be used. Suitable amines include: methylamine; ethylamine; butyl amine; di-methyl amine; di-ethyl amine; di-propylamine; di-butylamine; tri-methylamine; tri-ethylamine; tri-propylamine; tri-butylamine; N-methyl-ethylamine; N-methyl-di-butylamine; N-methyl-methanol-amine, N-ethyl ethanolamine; di-ethyl ethanolamine; di-glycolamine; and the like. Generally, such amines will contain 1–5 carbon atoms (e.g. 1–2 carbon atoms) in each N-substituted radical. For some reason, presently unknown, only tri-ethylamine and N-ethyl-ethanol amine produce textured or wrinkled finishes. N-ethyl-ethanol amine is preferred because it produces aqueous dispersions of the acidic polyester which are quite stable. This is true even after the epoxy (e.g. epoxidized tetra-tall oil ester of pentaerythritol) has been blended with the aqueous dispersion of the acidic polyester. Although tri-ethyl amine can be used to form a textured finish, aqueous dispersions made from it tend to be storage instable. Moreover, such systems are very sensitive to variations in concentration, etc., and will produce clear, glass-like, glossy films if not carefully controlled.

When wrinkle finishes are not desired, I prefer to use di-alkanol amines such as di-ethanol amine or di-glycol amine. Di-ethanol amine is preferred for smooth, glossy films. This is so because mixtures of aqueous dispersions of acidic polyester (prepared with di-ethanol amine) and epoxies (e.g. epoxidized polyesters of fatty acids and polyhydric alcohols) are storage stable for as long as two months or more and can be at least partly reduced with more water.

WETTING AGENTS

The wetting agents which can be used to assist in the preparation of homogenous mixtures can be any compatible water-miscible wetting agent, such as the glycol ethers and their corresponding esters, e.g. ethylene glycol monoethyl ether, diethylene glycol, ethylene glycol, mono-ethyl ether acetate, and the like. Mixtures of wetting agents can be used. Wetting agents can be omitted.

ACIDIC POLYESTERS

The acidic polyesters will be used as solutions in organic solvents. Desirably, an acidic polyester will be used as at least a 30% NV (non-vilatile) solution (e.g. at least 50% NV). For my purposes, the acidic polyesters which are partially or completely soluble in mineral spirits are preferred. I particularly prefer to use acidic polyesters which are dissolved in mineral spirits as the predominant or only solvent.

Acidic polyesters partially or completely soluble in mineral spirits can be prepared by chemically introducing a functional aliphatic substituent (e.g. a fatty acid) into the polyester formed by reacting polycarboxylic acids or anhydrides with polyhydric alcohols. Branched-chain substituents seem to provide the best results in terms of the solubility of the resulting polyester in mineral spirits.

The acidic polyesters can be prepared by any of the variius methods known to the art. See U.S. 3,218,274 and U.S. 3,196,117. Thus, the polyesters can be prepared by the sequential or simultaneous reaction of the various ester-forming ingredients. Acidic polyesters prepared from chlorinated polycarboxylic acids, alone or in admixture with non-chlorinated polycarboxylic are the most reactive with epoxies at lower temperatures.

Typically, from 0.1 to 0.5 mole, preferably from 0.2 to 0.4 mole (usually about 0.25 mole) of the aliphatic modifier can be reacted with one equivalent weight of the polyhydric alcohol or polycarboxylic acid, as appropriate. Thus, for a tetrol such as pentaerythritol, one mole of acidic modifier (e.g. stearic acid) will be used per mole or pentaerythritol, In preparing acidic polyesters, the relative amounts of pilyhydric alcohol, polycarboxylic acid, and functional modifier should be selected to provide a ratio of the total number of free carboxyl groups to the total number of free hydroxyl groups of from 1:1 to 3:1. Preferably, this ratio will be within the range of frim 1.5:1 to 2.2:1 and even more preferably about 1.8 carboxyl groups for each hydroxyl group. In making this calculation, anhydride groups are treated as being the equivalent of two (2) carboxyl groups. If the functional modifier is not a monocarboxylic acid or monohydric alcohol, its single reacting functional group (e.g. an isocyanate group) should nonetheless be taken into consideration and should be treated as if it were a carboxyl or hydroxyl group, depending upon whether it reacts with a hydroxyl or carboxyl group. For example, an isocyanate group will react with a hydroxyl group and is considered as the equivalent of one (1) free carboxyl groups for purposes of making the aforementioned calculation.

The esterification reaction is conducted to preferably react most of all of the available hydroxyl groups. The resulting esterification reaction product (i.e. the modified acidic polyester) should have an acid value of at least 50 and preferably of at least 80. Acid values over 100 are desirable.

Suitable polyhydric alcohols include the simple polyhydric alcohols such as ethylene glycol, propylene glycol, neo-pentyl glycol, glycerol, hexane-1,2,6-triol, trimethylol ethane, trimethylol propane, sorbitol, pentaerythritol, dipentaerythritol, and the like. Typically, these simple or common polyhydric alcohols will contain from 2–15, e.g., 3–8 carbon atoms, and 2 or more (e.g. 3–8) free or unreacted hydroxyl groups. Mixtures of polyhydric alcohols can be used. The saturated aliphatic polyhydric alcohols, particularly the unsubstituted saturated aliphatic polyhydric alcohols having at least three hydroxyl groups attached to a hydrocarbyl backbone are preferred. Still further, polyhydric alcohols having no hydrogen atoms attached to their beta carbon atoms are preferred, e.g., trimethylol ethane, trimethylol propane, and pentaerythritol. Pentaerythritol (pure or technical grade) is especially preferred.

Suitable non-chlorinated polycarboxylic acids include maleic anhydride, trimellitic acid, tetrahydrophthalic acid, hexahydrophthalic acid, isophthalic acid, phthalic anhydride, and the like. If desired, mixtures of non-chlorinated polycarboxylic acids can be used. Where they exist, the corresponding anhydrides can be used. Phthalic anhydride is the preferred non-chlorinated polycarboxylic acid.

Suitable chlorinated polycarboxylic acids are dichloro maleic acid, hexachlorophthalic acid, tetrachlorophthalic acid, monochlorophthalic acid, hexachloroendomethylene tetrahydrophthalic acid and the like. Mixtures of chlorinated polycarboxylic acids can be used. Where they exist, the corresponding anhydrides can be used. Hexachloroendomethylene tetrahydrophthalic acid (i.e. chlorendic acid) and its anhydride is the preferred chlorinated polycarboxylic acid.

Suitable functional aliphatic modifiers are the acyclic hydrocarbons having one or two functional substituents (i.e. groups) which are reactive with carboxyl groups or hydroxyl groups. Such functional modifiers include the saturated and unsaturated, substituted and unsubstituted $C_8$–$C_{26}$ aliphatic monocarboxylic acids (e.g. stearic acid), the corresponding monohydric alcohols (e.g. lauryl alcohol), the corresponding monoisocyanates (e.g. n-hexadecyl isocyanate); and the corresponding α-olefin oxides (e.g., n-$C_{12}$ α-olefin oxide). Mono-functional modifiers are preferred over the di-functional modifiers. Such functional modifiers include tall oil fatty acids, soya fatty acids, castor fatty acids, lauryl alcohol, oleyl alcohol, palmitoleic acid, erucic acid, licanic acid, linseed oil fatty acids, tallow fatty acids, coconut oil fatty acids, hydrogenated tallow fatty acids, oleic acid, myristic acid, pelargonic acid, iso-stearic acid, 12-hydroxy stearic acid, behenic acid, lauric acid, isooleic acid, elaidic acid, etc.

In terms of overall effectiveness and performance, the $C_{12}$–$C_{20}$ aliphatic modifiers (and mixtures thereof) are preferred. At lower chain lengths (e.g. $C_8$) the improvements in solubility are not as great, while at higher chain lengths (e.g. $C_{24}$) the properties (e.g. stain resistance) of cured films are not as good. Best results have been obtained at a carbon chain length for the functional modifier of $C_{18}$. Monocarboxylic acids, especially stearic acid and its isomers, as well as mixtures containing it, are preferred functional modifiers.

EPOXY COMPONENTS

The epoxy component can be an epoxidized fatty compound (e.g. epoxidized linseed oil), a hisphenol-epochlorohydrin resin (e.g. Epon 828), a cyclic diepoxide (e.g. Unox 201), a glycidyl ester or ether, etc.

I prefer to use an epoxidized fatty compound (or a mixture thereof) as the predominant (i.e. more than 50 weight percent of the epoxy component) or only epoxy component. Suitable epoxidized fatty compounds are the epoxidized fatty oils (e.g. epoxidized soybean oil), epoxidized fatty acid esters of monohydric alcohols (e.g. epoxidized methyl oleate), epoxidized fatty acid esters of polyhydric alcohols (e.g. epoxidized tetra-tall oil ester of pentaerythritol), epoxidized fatty nitriles (e.g. epoxidized oleyl nitrile), epoxidized fatty amides, epoxidized fatty amines, and epoxidized fatty alcohols. Such epoxidized fatty compounds are known in the art. Typically, these epoxidized fatty compounds will have 8 to 26 carbon atoms (e.g. 12 to 22 carbon atoms) in each of the fatty radicals and have an internal oxirane value of from 4% to 10%. The oxirane value of the epoxidized fatty compounds will preferably be at least 5.5%.

Particularly preferred for use as the epoxy component of this invention are the curable epoxidized polyesters of fatty acids and cyclic or acyclic polyhydric alcohols. These epoxidized esters, having internal oxirane, will generally contain from 2 to 12 carbon atoms in the alcohol portion. Illustrative epoxidized fatty acid esters are: epoxidized soybean oil; epoxidized linseed oil; epoxidized safflower oil; epoxidized 1,5-pentanediol dioleate; epoxidized 1,2,6-dexanetriol dioleate monoacetate; epoxidized glycerol trilinoleate; and the epoxidized di-, tri-, or full esters of mono-, di- or poly-pentaerythritol with soy, tall or linseed fatty acids. Mixtures of epoxidized esters can be used.

Epoxidized compounds of different types and oxirane values can be blended together to obtain various properties, e.g. improved resistance to yellowing, improved drying speed, and the like. When a mixture of epoxidized fatty compounds is used, the mixture should have an average internal oxirane value of at least 5.5%.

The epoxy components can be used at 100% NV (if they are liquid) or can be diluted with solvent (e.g. epoxidized linseed oil at 90% NV in xylol).

USE OF THE AMINE-MODIFIED ACIDIC POLYESTERS

The amine-modified aqueous dispersions of the acidic polyesters can be used as co-reactants or curing agents for the various epoxy components. The amount used will be a curing amount, i.e. an amount sufficient to co-react with the epoxy and give a hard, tack-free film. For most coating applications, more than 50 but less than 200 parts by weight of acidic polyester (excluding amine, water, solvent, etc.) will be used per 100 parts by weight of epoxy (on a solids basis). Optimum results usually occur when from 80–180 (e.g. 120–150) parts by weight of acidic polyester are used.

In use, the amine-modified, aqueous dispersion of the acidic polyester is simply mixed with the epoxy component to produce a coating composition which can be cured (e.g. by baking with or without added catalysts or other reactants) to provide a hard, tack-free mar-resistant finish which will be textured or smooth, depending upon the choice of amine. The final mixture (e.g. a paint or varnish before curing) will generally have from 20% to 80% total non-volatile solids (i.e. polyester, epoxy and amine), although contents of about 40-60% are preferred. The remainder of the mixture will be solvent and water.

If desired, various pigments, fillers, extenders, dyes, driers, stabilizers, other active ingredients (e.g. water soluble alkylated melamine formaldehyde resins) and the like can be added to the package containing the epoxy, to the package containing the polyester, or to the resulting mixture to thereby form, for example, a paint. The resulting mixture can be applied to substrates (e.g. wood) by brushing or spraying to thereby form thin wet films. These wet films are then cured, usually by baking. Partial pre-reaction of the epoxy and polyester components as well as catalysis (e.g. phosphoric acid, alone or with stannous octoate) can be used to shorten the curing time or reduce the curing temperature (e.g. reduce it to room temperature). However, it should be noted that the amine-modified aqueous coating vehicles of the present invention can co-react and cure in thin films the absence of any additional or supplemental co-reactants, curing agents, or catalysts.

The textured or wrinkled finishes produced by this invention are useful in preparing painted "vinyl-like" automobile tops and in coating fabric (e.g. cotton fabric) to produce a leather or vinyl substitute.

The present invention will be further understood by reference to the following examples. Unless otherwise indicated, all parts and percentages are by weight.

Example 1.—Preparation of an acidic polyester

An acidic polyester was prepared by mixing 284.7 parts by weight of commercial stearic acid, 150 parts of technical grade pentaerythritol, 1164 parts of chlorendic acid and 383.3 parts of mineral spirits and placing them in a glass flask equipped for an esterification reaction. The mineral spirits (Amco's regular mineral spirits) had an ASTM distillation range of 310°–395° F., an aniline point of 53°–59° C., a specific gravity of 0.7796 (avg.) and a flash point of 100° F., minimum. The esterification flask was then heated. After 30 minutes, the temperature was about 280° F., and the first sign of water evolution was noted. A good reflux rate was maintained by adjusting the heat to maintain a maximum reaction temperature of 350°–360° F. Water of esterification ceased being evolved soon after the temperature reached 350°–360° F. After water ceased to be evolved, the temperature was maintained for an additional ½ to 1 hour. The esterification reaction mixture was then cooled to 320° F. and cut to 50% non-volatile (NV) with additional mineral spirits. The entire preparation of this acidic polyester required about 3 hours of reaction time measured from the first evidence of water evolution until the time the reaction mixture was cooled. The product was 50% NV, had an acid number of 99 (corrected to 100% NV) a viscosity of X½ on the Gardner Holdt scale, a Gardner color 2½ and was infinitely soluble or dilutable in mineral spirits.

Other acidic polyesters can be prepared by repeating the foregoing process, using xylol in place of the mineral spirits, which permits the maximum reaction temperature to be maintained at 310°–320° F. A typical acidic polyester prepared in xylol is 70% NV, has an acid number of 113 (corrected to 100% NV), a viscosity of X½ on the Gardner Holdt scale, a Gardner color of 1½ and is infinitely solube or dilutable in both mineral spirits and xylol.

Example 2.—Preparation of an amine-modified, aqueous acidic polyester 105 grams of an organic solvent solution of acidic polyester was placed in a high speed mixer. This acidic polyester was prepared from pentaerythritol, $C_{16}$–$C_{18}$ saturated fatty acids, and chlorendic acid in a molar ratio of 1:1:3. The polyester had an acid value (corrected to 100% solids or NV) of 104, and was 60% NV in a mixture (85/15) of mineral spirits and Cellosolve acetate. A mixture of 63 grams of water, 7 grams of Cellosolve acetate and 30 drops of a commercial wetting agent (Anti-Terra-Nitro) was prepared. This mixture and 10 grams of N-ethyl ethanolamine were added intermittently to the polyester mixture in the high speed mixer. The amine was added slowly to ensure an even dispersion and additional portion of amine were added until the solution became clear. Then, an additional one-half gram of amine was introduced into the mixture, raising the total weight of amine used to approximately 11 grams.

The resulting mixture was clear and could be reduced or diluted with additional water.

Example 3.—Preparation of a black wrinkle finish

Six parts by weight of a commercial black pigment were mixed into 108 parts by weight of epoxidized dipentaerythritol polyester of tall oil fatty acids having an internal oxirane value of approximately 7.7% (used at 100% NV).

Then, 38.0 parts by weight of the amine-modified polyester of Example 2, 8.4 parts by weight of the black pigmented epoxidized ester and 2.0 parts by weight of water were well mixed and applied as a thin film to a metallic substrate followed by flashing (i.e. air drying) for 10 minutes, heating at 110° F. for 10 minutes, and then at 300° F. for 35 minutes. The product was a hard glossy wrinkle-finish of excellent appearance.

If this coating composition is applied to the roof of an automobile and baked, the result will be a simulated vinyl top.

If the water in the final mixture is replaced with acetone, the wrinkle-finish will be of a finer texture. The addition of 1.5 parts by weight of a flatting agent (e.g. a talc), to the curable mixture of epoxy and polyester will cause the resulting wrinkle-finish to have a lower gloss.

Example 4.—Preparation of a multi-color web or pattern 36 parts by weight of a commercial titanium dioxide pigment (white) and 4 parts by weight of a commercial green pigment were well dispersed in 108 parts by weight of the epoxidized ester of Example 3 to form a first mixture.

A second mixture was prepared from 65 parts by weight of white, water dispersible pigment (A–WD) which had been well dispersed in 35 parts by weight of water.

Then, a mixture was prepared from 38.0 parts by weight of the amine-modified polyester of Example 2, 24.0 parts by weight of the white and green pigmented epoxy (i.e. the first mixture) and 10.0 parts by weight of the second mixture. This composition was well mixed and applied to a metallic substrate, flashed for 15 minutes, heated for 20 minutes at 100° F., heated for 20 minutes at 200° F., and finally heated for 20 minutes at 300° F. The resulting finish was a two-color web pattern comprising internal background portions of green edged with raised, web-like, lacy lines of white to produce a novel textured finish.

Example 5.—Effect of film thickness on texture

An amine-modified polyester is prepared as described in Example 2 using 11 parts by weight of N-ethyl ethanolamine, 100 parts by weight of the solvent diluted polyester of Example 2, 54 parts by weight of water, and 6 parts by weight of Cellosolve acetate. The resulting amine-modified polyester will be a clear solution containing 41.5% solids. The shelf life of this amine-modified polyester will be in excess of 6 weeks.

When 40 parts by weight of the epoxidized ester of Example 3 is mixed with this amine-modified polyester, the resulting mixture will contain 52.5% solids. When this coating composition is applied to a substrate as a wet film in a thickness less than 3 mils (e.g. 1 mil), a smooth hard coating may result. When the wet film thickness is at least 3 mils, the final coating is a wrinkle-finish.

In this regard, I have found that the film thickness (wet) should be 3 mils or greater when preparing textured finishes. As wet film tickness is reduced, the roughness or texture becomes more moderate and tends to disappear at film thicknesses of, for example 1–1.5 mils (using a 40% NV coating composition). Consequently, I prefer to use coating compositions (i.e. epoxy plus polyester) at solids levels above 40% by weight (e.g. 45–70% NV) and wet film thicknesses of at least 3 mils (e.g. 3–10 mils) when preparing a textured surface on rigid substrates (e.g. metal).

Example 6.—Direct preparation of simulated vinyl fabric

A piece of cotton cloth is stretched over an open square steel frame such that the cotton cloth is gripped by the frame at the edges with both sides of the cloth uncovered across the middle of the frame. A coating solution is prepared using the black coating composition of Example 3 and diluting it with a mixture of equal parts of acetone and water such that the solids content of the coating composition is 30%. A heavy coating (e.g. 8 mils wet) of the solution is then sprayed on the cotton cloth (stretched on the frame) and the cloth is placed in an oven and cured (e.g. at 300° F. for 15 minutes). When the coated material is removed from the oven, it will have an appearance similar to the artificial leather sometimes referred to as a vinyl leather.

Similar results have been obtained with nylon cloth. The resulting products are of generally better quality (e.g. better tear resistance).

Example 7.—Preparation of laminate

The coating composition of Example 3 is sprayed on a piece of release paper to produce a wet film thickness of about 2–3 mils. Next, the coated paper is placed in a 300° F. oven until the wet surface is almost tack-free. The coated paper is then removed from the oven and, while still hot, a piece of cotton cloth is pressed to the slightly tacky surface and the resulting laminate is returned to the oven where it is completely cured. After the curing is finished, the release paper is removed and the coating uncovered by removal of the release paper is sprayed with a second layer, 6 mils in thickness, of the coating composition of Example 3. The final article is cured at 300° F. for about 15 minutes to produce a textured leather-like finish with a cotton cloth backing.

When compared to one commercially available cloth-backed vinyl, the laminate of this invention is found to be softer to the touch and have better tear strength.

Similarly, the textured film of this invention is softer and does not stretch out of shape to the extent of a commercial vinyl film, both being stripped of their cloth backings before making the comparison.

Substantially, the same results are produced when a nylon cloth is employed instead of the cotton cloth.

Although the present invention has been described with a certain degree of particularity, it will be realized that numerous modifications and variations, as well as uses falling within the spirit and scope of this invention will become obvious to one routinely engaged in this art.

What is claimed is:

1. The process of preparing a cured wrinkled or textured coating on a substrate which comprises the steps of:
   (a) forming a first mixture by mixing an organic solvent solution of acidic polyester with water and N-ethl ethanolamine in an effective amount to cause wrinkling of the cured coating;
   (b) mixing an epoxidized fatty compound or a mixture thereof with the first mixture in an amount sufficient to co-react with said polyester and thereby form a second mixture;
   (c) applying said second mixture to a supporting substrate; and
   (d) curing said second mixture.

2. The process of claim 1 wherein acetone is included in said second mixture.

3. Process of claim 1 wherein said second mixture contains a pigment.

4. The process of claim 1 wherein the substrate is coated with said second mixture to a thickness of at least 3 mils before curing.

5. An article of manufacture having a surface coated with a wrinkled or textured finish produced by the process of claim 1.

6. An article of manufacture having a surface coated with a wrinkled or textured finish produced by the process of claim 4.

References Cited

UNITED STATES PATENTS

| | | | |
|---|---|---|---|
| 2,691,004 | 10/1954 | Doyle | 260—22 |
| 2,967,840 | 1/1961 | Phillips et al. | 260—22 |
| 3,027,341 | 3/1962 | Boucher et al. | 260—22 |
| 3,055,869 | 9/1962 | Wilson et al. | 260—75 |
| 3,089,863 | 5/1963 | Hicks et al. | 260—75 |
| 3,196,119 | 7/1965 | Boller et al. | 260—22 |
| 3,218,274 | 11/1965 | Boller et al. | 260—22 |
| 3,230,162 | 1/1966 | Gilchrist | 260—22 |
| 3,397,255 | 8/1968 | Coats et al. | 260—850 |
| 3,419,510 | 12/1968 | Hudak | 260—22 |

DONALD E. CZAJA, Primary Examiner

R. W. GRIFFIN, Assistant Examiner

U.S. Cl. X.R.

117—132, 148, 161, 167; 260—21, 22, 29.2, 32.6, 32.8, 33.6, 40. 834, 835